United States Patent
Philip et al.

(10) Patent No.: US 12,340,457 B2
(45) Date of Patent: Jun. 24, 2025

(54) RADIANCE FIELD GRADIENT SCALING FOR UNBIASED NEAR-CAMERA TRAINING

(71) Applicant: Adobe Inc., San Jose, CA (US)

(72) Inventors: Julien Philip, London (GB); Valentin Deschaintre, London (GB)

(73) Assignee: Adobe Inc., San Jose, CA (US)

( * ) Notice: Subject to any disclaimer, the term of this patent is extended or adjusted under 35 U.S.C. 154(b) by 222 days.

(21) Appl. No.: 18/207,923

(22) Filed: Jun. 9, 2023

(65) Prior Publication Data

US 2024/0412444 A1 Dec. 12, 2024

(51) Int. Cl.
| | |
|---|---|
| *G06T 15/06* | (2011.01) |
| *G06T 3/40* | (2006.01) |
| *G06T 7/70* | (2017.01) |
| *G06T 7/90* | (2017.01) |
| *G06V 10/74* | (2022.01) |

(52) U.S. Cl.
CPC ............... *G06T 15/06* (2013.01); *G06T 3/40* (2013.01); *G06T 7/70* (2017.01); *G06T 7/90* (2017.01); *G06V 10/761* (2022.01); *G06T 2207/20081* (2013.01); *G06T 2207/20084* (2013.01)

(58) Field of Classification Search
CPC .............. G06T 15/06; G06T 7/70; G06T 7/90
USPC ....................................................... 345/419
See application file for complete search history.

(56) References Cited

U.S. PATENT DOCUMENTS

| | | | | |
|---|---|---|---|---|
| 11,869,132 | B2* | 1/2024 | Kim | ................. G06T 15/04 |
| 2021/0174539 | A1* | 6/2021 | Duong | .................. G06N 5/01 |
| 2024/0070972 | A1* | 2/2024 | Kosiorek | ............... G06N 3/045 |
| 2025/0037244 | A1* | 1/2025 | Mildenhall | ............... G06T 5/60 |

OTHER PUBLICATIONS

Mildenhall et al., NeRF: Representing Scenes as Neural Radiance Fields for View Synthesis (Year: 2022).*
Deng et al., Depth-supervised NeRF: Fewer Views and Faster Training for Free (Year: 2022).*
Kendall et al., PoseNet: A Convolutional Network for Real-Time 6-DOF Camera Relocalization (Year: 2016).*
Zhang et al. NeRFactor: Neural Factorization of Shape and Reflectance Under an Unknown Illumination (Year: 2021).*

(Continued)

*Primary Examiner* — Samantha (Yuehan) Wang
(74) *Attorney, Agent, or Firm* — Kilpatrick Townsend & Stockton LLP

(57) ABSTRACT

Methods and systems disclosed herein relate generally to radiance field gradient scaling for unbiased near-camera training. In a method, a processing device accesses an input image of a three-dimensional environment comprising a plurality of pixels, each pixel comprising a pixel color. The processing device determines a camera location based on the input image and a ray from the camera location in a direction of a pixel. The processing device integrates sampled information from a volumetric representation along the ray from the camera location to obtain an integrated color. The processing device trains a machine learning model configured to predict a density and a color, comprising minimizing a loss function using a scaling factor that is determined based on a distance between the camera location and a point along the ray. The processing device outputs the trained ML model for use in rendering an output image.

20 Claims, 8 Drawing Sheets

(56) References Cited

OTHER PUBLICATIONS

Aliev et al., Neural Point-Based Graphics, Available online at: arXiv:1906.08240v3.2, Apr. 5, 2020, pp. 1-16.

Barron et al., Mip-NeRF 360: Unbounded Anti-Aliased Neural Radiance Fields, 2022 IEEE/CVF Conference on Computer Vision and Pattern Recognition (CVPR), Mar. 25, 2022, pp. 5470-5479.

Barron et al., Mip-Nerf: A Multiscale Representation for Anti-Aliasing Neural Radiance Fields, Available online at: arXiv:2103.13415.2,4, 2021, pp. 5855-5864.

Chen et al., TensoRF: Tensorial Radiance Fields, European Conference on Computer Vision (ECCV), Nov. 29, 2022, pp. 1-33.

Hedman et al., Baking Neural Radiance Fields for Real-Time View Synthesis, International Conference on Computer Vision, 2021, pp. 5875-5884.

Hedman et al., Deep Blending for Free-Viewpoint Image-Based Rendering, ACM Transactions on Graphics, vol. 37, No. 6, Nov. 2018, pp. 257:1-257:15.

Hedman et al., Scalable Inside-Out Image-Based Rendering, ACM Transactions on Graphics, vol. 35, No. 6, Nov. 2016, pp. 231:1-231:11.

Jambon et al., Nerfshop: Interactive Editing of Neural Radiance Fields, Proceedings of the ACM on Computer Graphics and Interactive Techniques, vol. 6, No. 1, May 2023, pp. 1-21.

Kopanas et al., Neural Point Catacaustics for Novel-view Synthesis of Reflections, ACM Transactions on Graphics, vol. 41, No. 6, Dec. 2022, pp. 1-15.

Kopanas et al., Point-Based Neural Rendering with Per-View Optimization, Computer Graphics Forum, vol. 40, No. 4, Sep. 8, 2021, 15 pages.

Mildenhall et al., MultiNeRF: A Code Release for Mip-NeRF 360, Ref-NeRF, and RawNeRF, Available Online at: https://github.com/google-research/multinerf, Oct. 13, 2022, 8 pages.

Mildenhall et al., NeRF in the Dark: High Dynamic Range View Synthesis from Noisy Raw Images, Conference on Computer Vision and Pattern Recognition, Nov. 26, 2021, 18 pages.

Mildenhall et al., NeRF: Representing Scenes as Neural Radiance Fields for View Synthesis, European Conference on Computer Vision, Aug. 3, 2020, pp. 1-25.

Muller, et al., Instant Neural Graphics Primitives with a Multiresolution Hash Eencoding, ACM Trans. Graph., vol. 41, No. 4, Article 102, Jul. 2022, 15 pages.

Nimier-David et al., Unbiased Inverse Volume Rendering with Differential Trackers, ACM Transactions on Graphics, vol. 41, No. 4, Available Online at: https://dl.acm.org/doi/pdf/10.1145/3528223.3530073, Jul. 2022, pp. 1-20.

Ortiz-Cayon et al., A Bayesian Approach for Selective Image-Based Rendering using Superpixels, International Conference on 3D Vision (3DV), Available Online at: http://www-sop.inria.fr/reves/Basilic/2015/ODD15, 2015, 9 pages.

Philip et al., Free-viewpoint Indoor Neural Relighting from Multi-View Stereo, ACM Transactions on Graphics, vol. 1, No. 1, Article 1, Available Online at: http://www-sop.inria.fr/reves/Basilic/2021/PMGD21, Jan. 2021, 18 pages.

Rakhimov et al., NPBG++: Accelerating Neural Point-Based Graphics, In Proceedings of the IEEE/CVF Conference on Computer Vision and Pattern Recognition (CVPR), Jun. 2022, 11 pages.

Reiser et al., KiloNeRF: Speeding up Neural Radiance Fields with Thousands of Tiny MLPs, Available Online at: https://arxiv.org/pdf/2103.13744.pdf, Aug. 2, 2021, 11 pages.

Riegler et al., Free View Synthesis, In European Conference on Computer Vision, Aug. 12, 2020, 17 pages.

Riegler et al., Stable View Synthesis, In Proceedings of the IEEE Conference on Computer Vision and Pattern Recognition, May 2, 2021, 13 pages.

Roessle et al., Dense Depth Priors for Neural Radiance Fields from Sparse Input Views, In Proceedings of the IEEE/CVF Conference on Computer Vision and Pattern Recognition (CVPR), Jun. 2022, 12 pages.

Sun et al., Direct Voxel Grid Optimization: Super-Fast Convergence for Radiance Fields Reconstruction, Conference on Computer Vision and Pattern Recognition (CVPR), Jun. 3, 2022, 25 pages.

Sun et al., Improved Direct Voxel Grid Optimization for Radiance Fields Reconstruction, Available Online at: https://arxiv.org/pdf/2206.05085.pdf, Jul. 2, 2022, 5 pages.

Tewari et al., Advances in Neural Rendering, Computer Graphics Forum, State of The Art Report, vol. 41, No. 2, Available Online at: https://onlinelibrary.wiley.com/doi/abs/10.1111/cgf.14507,arXiv:https://onlinelibrary.wiley.com/doi/pdf/10.1111/cgf.14507, doi:https://doi.org/10.1111/cgf.1450, May 24, 2022, 33 pages.

Verbin et al., Ref-NeRF: Structured View-Dependent Appearance for Neural Radiance Fields, In Proceeding IEEE Conference on Computer Vision and Pattern Recognition (CVPR), Dec. 7, 2021, 14 pages.

Yang et al., FreeNeRF: Improving Few-Shot Neural Rendering with free Frequency Regularization, In Proceeding IEEE Conference on Computer Vision and Pattern Recognition (CVPR), Mar. 13, 2023, 16 pages.

Yu et al., PlenOctrees for Real-Time Rendering of Neural Radiance Fields, Computer Vision and Pattern Recognition, Aug. 2021, 18 pages.

Yu et al., Plenoxels: Radiance Fields without Neural Networks, In Proceeding IEEE Conference on Computer Vision and Pattern Recognition (CVPR), Dec. 9, 2021, 21 pages.

Zhang et al., NeRF++: Analyzing and Improving Neural Radiance Fields, Available online at https://arxiv.org/pdf/2010.07492.pdf, Oct. 21, 2020, pp. 1-9.

Zhang et al., The Unreasonable Effectiveness of Deep Features as a Perceptual Metric, In Proceedings of the IEEE Conference on Computer Vision and Pattern Recognition, Available Online at: https://openaccess.thecvf.com/content_cvpr_2018/papers/Zhang_The_Unreasonable_Effectiveness_CVPR_2018_paper.pdf, Jan. 1, 2018, pp. 586-595.

\* cited by examiner

```
class GradientScaler(torch.autograd.Function):
    @staticmethod
    def forward(ctx, colors, sigmas, ray_dist):
        ctx.save_for_backward(ray_dist)
        return colors, sigmas, ray_dist @staticmethod
    def backward(ctx, grad_output_colors, grad_output_sigmas, grad_output_ray_dist):
        (ray_dist,) = ctx.saved_tensors
        scaling = torch.square(ray_dist).clamp(0, 1)
        return grad_output_colors * scaling.unsqueeze(-1), grad_output_sigmas * scaling, grad_output_ray_dist
```

FIG. 5

RADIANCE FIELD GRADIENT SCALING FOR UNBIASED NEAR-CAMERA TRAINING

TECHNICAL FIELD

This disclosure generally relates to image rendering of a three-dimensional environment. More specifically, but not by way of limitation, this disclosure relates to techniques for radiance field gradient scaling for unbiased near-camera training for image rendering.

BACKGROUND

A diverse array of applications may require rendering of photorealistic, three-dimensional (3D) scenes given a set of two-dimensional (2D) images, sometimes called 3D reconstruction. In some examples, 3D reconstruction may involve extracting and matching key features across the 2D images and using these matches to reconstruct the 3D structure of the scene. The resulting 3D model can then be rendered under various viewing conditions, resulting in a photorealistic representation of the original scene. In some examples, machine learning (ML) techniques can be used to improve the accuracy and realism of the 3D reconstruction process. However, existing ML-based techniques may result in artifacts or errors in the rendered images.

SUMMARY

Systems and methods for gradient scaling while training a machine learning (ML) model for predicting the volumetric density at various points in a three-dimensional (3D) environment are provided. In one example, a method for training an ML model includes a processing device that accesses an input image of a 3D environment. The input image may include a number of pixels, each pixel having a particular color. The input image can be a photograph taken by a camera from a camera location in the 3D environment. A group of such images may be used to train the ML model.

A ray from the camera location in the direction of a particular pixel of the input image can be determined. A set of points along the ray can be sampled by providing the 3D coordinates of the sampled point and camera direction to the ML model undergoing training. The ML model may be trained to model an underlying volumetric representation of the 3D scene. The ML model can thus output a color and density for each sampled point based on the current state of the parameters of the ML model. The colors and densities can be combined to determine an integrated pixel color. The integrated pixel color can be compared to the "ground truth" value of the pixel in the input image. The integrated pixel color and ground truth value of the pixel in the input image can together define a loss function.

The ML model can be trained to minimize the loss function using a backpropagation algorithm involving the calculation of gradients to minimize the difference between predicted and actual values. Using the techniques of the present disclosure, a scaling factor can be used during the calculation of the gradients to, for example, compensate for the over-sampled density close to the cameras. Scaling the gradients in this way may result in unbiased near-camera training and the elimination of rendering artifacts such as background collapse. The trained ML model can be output for use in rendering an output image of the 3D environment to, for example, generate rendered images not included in the training data.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 5 shows example source code for radiance field gradient scaling for unbiased near-camera training, according to some aspects of the present disclosure.

DETAILED DESCRIPTION

Figure 1:
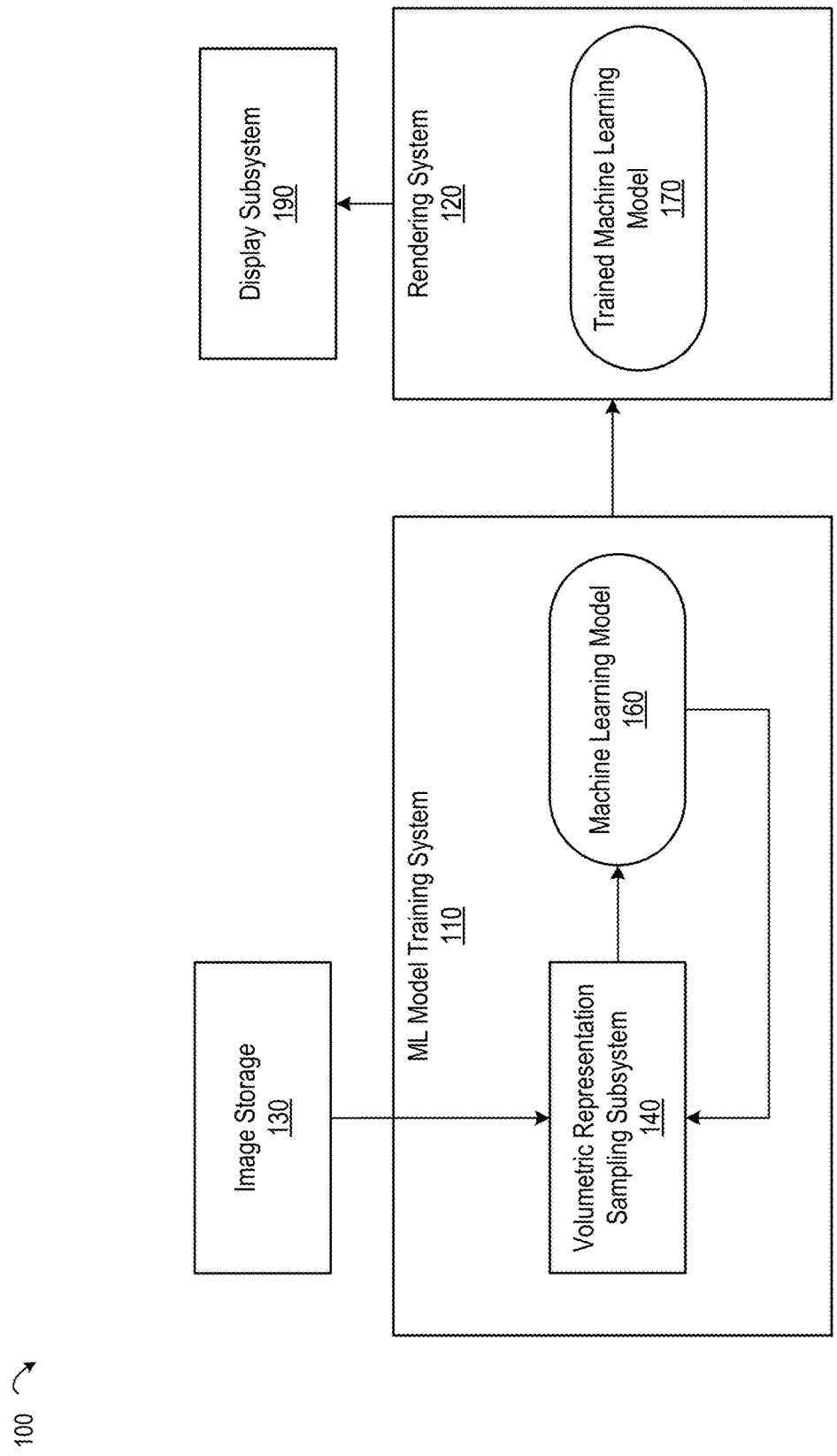
FIG. 1 depicts an example of an environment implementing techniques for radiance field gradient scaling for unbiased near-camera training, according to some aspects of the present disclosure.

Three-dimensional (3D) reconstruction includes techniques for rendering of images of a 3D environment given two-dimensional (2D) images of that 3D environment. For example, 2D images of a 3D environment may be captured from various direction using a camera. 3D reconstruction techniques are used to render images of the 3D environment from any direction, including directions that are not among the directions corresponding to the input images. The rendered images can be used, for example, to create 3D animations by combining rendered images from arbitrary directions. Some such techniques include mesh-based methods that rely on pre-computed geometry and reprojection or point-cloud-based methods.

Some 3D reconstruction techniques may involve using neural networks trained to perform 3D reconstruction and rendering of real captured objects and scenes given a set of multi-view images. For example, Neural Radiance Fields (NeRF) is one technique that can use a neural network to learn a 3D environment's volumetric representation from a set of 2D images. The volumetric representation is a function that maps 3D locations and 2D viewing directions to colors and densities. NeRF methods are used to optimize the volumetric representation through differentiable raymarching and volumetric rendering.

Training of the neural network used in a NeRF implementation seeks to model a volumetric representation, sometimes referred to as a radiance field. During training, the volumetric representation is sampled to obtain a predicted color and density (i.e., opacity) at a particular point in space. The density is a measure of how much the presence of an object at a given point in the 3D space would block or diminish light passing through that point. A higher density would correspond to a more solid or opaque part of an object that would block light more, while a lower density would correspond to a more transparent or empty space that light could pass through more easily. The predicted colors and densities are aggregated to obtain a color and compared with a ground truth color, which together define a loss function. Training of the neural network seeks to minimize the loss function through backpropagation techniques such as gradient descent.

Some NeRF-based methods may be vulnerable to reconstruction artifacts during volumetric rendering. Reconstruction artifacts include visual inaccuracies in the rendered output, such as distortions, blurriness, or ghosting, which can arise due to limitations in the training data, network capacity, or computational resources. Some artifacts include background collapse and "floaters." Background collapse includes visible floating artifacts appearing close to the camera, which can create the mistaken appearance of some of the background as foreground density. Likewise, floaters are visual artifacts also appearing close to the camera that appear to float between the camera and the 3D scene but are not necessarily a part of the background. Collectively, this class of artifacts will be referred to "background collapse." Traditional approaches to the elimination of these artifacts include adding an additional term in the loss function to force densities to concentrate around a single point or the use of a "near plane" during training. However, these approaches are ineffective in eliminating background collapse because of the prior assumptions and manual configuration such adaptations introduce.

Techniques for radiance field gradient scaling for unbiased near-camera training are provided that perform 3D volumetric rendering without background collapse. Moreover, the innovations of the present disclosure require no new prior assumptions or introduction of a near plane. Background collapse occurs, in part, due to bias from the outsized contribution of gradients associated with near-camera volume elements during neural network training. Such near-camera volume elements may be over-sampled and receive larger or more frequent gradients. Thus, in some examples, gradients associated with near-camera volume elements can be scaled during backpropagation to compensate for this bias.

The following non-limiting example is provided to introduce certain embodiments. In this example, a processing device accesses an input image of a 3D environment. The input image includes a set of pixels and each pixel of the set of pixels has a pixel color. The input image may be, for instance, a photograph of a 3D scene including an object (e.g., a ball or truck), taken from a particular direction. The input image, in combination with other input images taken from different directions, may be used together to constitute training data to train a neural network to generate images from directions not included in the training data.

In this example, the processing device determines a camera location based on the input image of the 3D environment. The camera location is used to establish a geometric relationship between the camera and the elements of the 3D scene and to determine a direction that the camera is pointing. For example, the input image may be taken from several feet away from the object and at a particular angle and azimuth angle with respect to the object. The processing device determines a ray from the camera location in the direction of a pixel. During training of the ML model, "ray-marching" is used to sample points along each ray (i.e., ray locations). At each sampled point, a measurement of color and density is made using the volumetric representation in its current training state.

Next, the processing device integrates the sampled information along the ray to obtain an integrated predicted color corresponding to the pixel. The processing device trains an ML model by minimizing a loss function defined based on a difference between the integrated predicted color and the actual pixel color of the pixel. Gradients of the loss function are determined and evaluated at each sample point along the ray. A scaling factor may be determined for each sample point along the ray based on a distance between the camera location and a point along the ray. The scaling factor is used to scale the gradient at each sampled point along the ray. Then, the scaled point-wise gradients are accumulated along the sampled points on the ray to determine an accumulated gradient. The parameters of the ML model are updated using a suitable gradient-based optimization algorithm, such as stochastic gradient descent, using the accumulated gradient. The application of the scaling factor reduces the bias introduced by over-sampled points close to the camera, which is a cause of background collapse.

Training of the ML model is repeated iteratively over a specified number of steps or time, or until a desired accuracy is attained. Likewise, the foregoing steps may be carried out using a set of input images over several iterations. The processing device outputs the trained ML model for use in rendering an output image of the 3D environment. The trained ML model includes a set of parameters that can be, for example, exported for use in an inference system. In one example inference system, the trained ML model can receive 3D coordinates and a camera direction in the 3D environment, which may not be found among the input images used for training and render an image of the 3D environment. The rendered image can be used in applications including robotics, urban mapping, autonomous navigation, or virtual reality/augmented reality, among others.

The techniques of the present disclosure constitute a significant improvement to the technical field of 3D reconstruction, particularly those techniques that utilize NeRF and various associated volumetric representations. 3D reconstruction techniques are useful to the extent that they are accurate and in particular, for camera locations and directions that are not among the training data, should be rendered free of artifacts or other distortions. The presence of background collapse and floater artifacts may be found in many implementations of NeRF technologies, which may differ principally in their underlying volumetric data structure. The techniques of the present disclosure reduce or eliminate background collapse in some NeRF implementations. These improvements are of particular utility in capture scenarios where objects are arbitrarily close or at varying distances from the cameras. Moreover, the techniques may be agnostic to the underlying volumetric representation and can be used with a diversity of volumetric representations (e.g., MLP, hash-grid, voxels, etc.). In some example implementations of the techniques disclosed herein, the addition of program code for radiance field gradient scaling for unbiased near-camera training amounts to a negligible increase in processing time and can readily be used in most codebases with minimal adaptations.

I. Overview

FIG. 1 depicts an example of an environment 100 implementing techniques for radiance field gradient scaling for unbiased near-camera training, according to some aspects of the present disclosure. FIG. 1 includes a machine learning (ML) model training system 110 and a rendering system 120, each of which may be a computing system similar to the system 800 depicted in FIG. 8 and the accompanying description. The configuration depicted in example environment 100 is merely illustrative and various suitable configurations may be used. For example, the ML model training system 110 and the rendering system 120 may be hosted by the same computing device or in co-located computing environments (e.g., a cloud computing environment) or in separate computing devices or environments. Example environment 100 is configured to perform three-dimensional (3D) reconstruction and rendering of real captured (e.g., photographed) objects and scenes given a set of multi-view images using a volumetric representation. The volumetric representation may be a continuous, differentiable function including a fully-connected neural network, a point cloud, a voxel hash-grid, a tensor decomposition, or a direct mapping to voxels.

The ML model training system 110 may include components for training an ML model 160 that is configured to model a volumetric representation. For example, the ML model 160 may be a neural network in a system configured for performing 3D reconstruction using neural radiance field (NeRFs). In a system using NeRF for 3D reconstruction, novel views of complex 3D scenes are typically synthesized by training a fully connected neural network (e.g., a multilayer perceptron) to map 3D coordinates to densities and colors. These densities and colors are integrated to determine a pixel color in a rendered image. In some examples, a NeRF model can be parameterized using a construct other than a neural network. For example, the underlying volumetric representation can be parameterized as a voxel grid using spherical harmonics. The methods of the present disclosure apply equally well to such a parameterization.

The ML model training system 110 receives one or more input images from an image storage 130. For example, 3D reconstruction of a particular 3D environment may be preceded by capturing of the 3D environment using a calibrated camera. Calibrated cameras include cameras such as ones that have been accurately adjusted and configured to ensure precise capture of positional and orientation details, along with focal length, for each image taken. This calibration information is used to map 2D input image pixel locations to 3D coordinates of the 3D environment. For example, the camera location may be determined based on the input image and information about the 3D environment included as metadata along with the input image. In some examples, a calibrated camera may be used to capture the input image and the input image may include geometric information about the camera location with respect to the 3D environment that is embedded or otherwise associated with the input image.

The image storage 130 may store and send input images to ML model training system 110 using any suitable image file format. Some examples may store input images using the Joint Photographic Experts Group (JPEG) format, the Portable Network Graphics (PNG), or other file formats. However, lossy formats like JPEG can result in some data loss and can introduce artifacts that might affect the model performance. Thus, lossless formats like PNG may provide higher fidelity at the expense of larger file sizes and increased computational overhead.

The ML model training system 110 includes a volumetric representation sampling subsystem 140. An example implementation of a volumetric representation sampling subsystem 140 is shown in detail in FIG. 2 which will be described later. In some examples, during training of the ML model 160, the volumetric representation sampling subsystem 140 determines a camera location based on an input image of the 3D environment received from the image storage 130. The volumetric representation sampling subsystem 140 then determines a ray projected from the camera location in a direction of a pixel included in the input image. The volumetric representation sampling subsystem 140 determines a set of points along the ray to sample. At each sample point, the volumetric representation modeled by the ML model 160 is sampled by providing an input to the ML model. The input includes at least the 3D coordinates of the sample point and the ray or camera direction. The ML model 160 outputs a density and a color in accordance with the volumetric representation as modeled by the internal state of the ML model 160. The densities and colors sampled at the selected sample points are integrated (e.g., through an accumulation procedure) to obtain a predicted color.

The integrated predicted color is then compared with the "ground truth" pixel color from the input image. For example, the predicted color and the pixel color from the input image can be used to define a loss function. The ML model 160 is trained by iteratively performing the sampling and comparison process described and minimizing the loss function so defined. Minimization of the loss function is performed to reduce the difference between the outputs of the volumetric representation modeled by the ML model 160 and the ground truth of the 3D environment. For example, minimization of the loss function can be achieved through backpropagation, which uses calculated gradients to decrease the loss, thereby improving the model predictive accuracy.

In some examples, gradients may be calculated at the points sampled along the ray and then accumulated (e.g., summed) to obtain a gradient that can be applied to the ML model 160 parameters to minimize the loss function. Techniques for radiance field gradient scaling for unbiased near-camera training are used to minimize artifacts like background collapse or floaters that may manifest during rendering by the rendering system 120 using a trained ML model 170. In some examples, a scaling factor can be determined based on a distance between the camera location and the point along the ray. The scaling factor can be, for example, applied to the point-wise gradients prior to accumulation. The application of the scaling factor may, for example, compensate for the over-sampled density close to the cameras while leaving the rest of the gradients further away from the camera unscaled, as discussed in detail in FIG. 3 and the accompanying description.

After training, the ML model training system 110 outputs a trained ML model 170 for use by the rendering system 120. The rendering system 120 may include components for providing input to the trained ML model 170 to obtain densities and colors modeled by the underlying volumetric representation. The predicted densities and colors, which may be associated with a novel point of view (i.e., camera location) not included among the input images used during training, are again accumulated and used to render an image of the 3D environment. The rendered image may be displayed using, for example, display subsystem 190. In some examples, the rendering system 120 can combine rendered images to generate an animation or video depicting motion through the 3D environment, including video frames from novel points of view (i.e., frames not in the training data) that are generated by the trained ML model 170.

A display subsystem 190 may include program code for displaying images, videos, or animations generated by the rendering system 120. For example, the display subsystem 190 may include one or more image viewers or one or more video players. Likewise, the display subsystem 190 may include one or more hardware devices for displaying the rendered images and videos generated by the rendering system 120. For example, the display subsystem 190 may include laptop screens, desktop monitors, smartphone displays, and so on. Such hardware display devices may be included in one or more client devices. In some examples, the display system 190 may display input images associated with training the trained ML model 170 for, for example, diagnostic purposes during training. The display subsystem 190 may also display informative alerts, notifications, and messages associated training and rendering to provide information to client devices regarding the status of those processes.

II. Training of the Machine Learning Model

Figure 2:
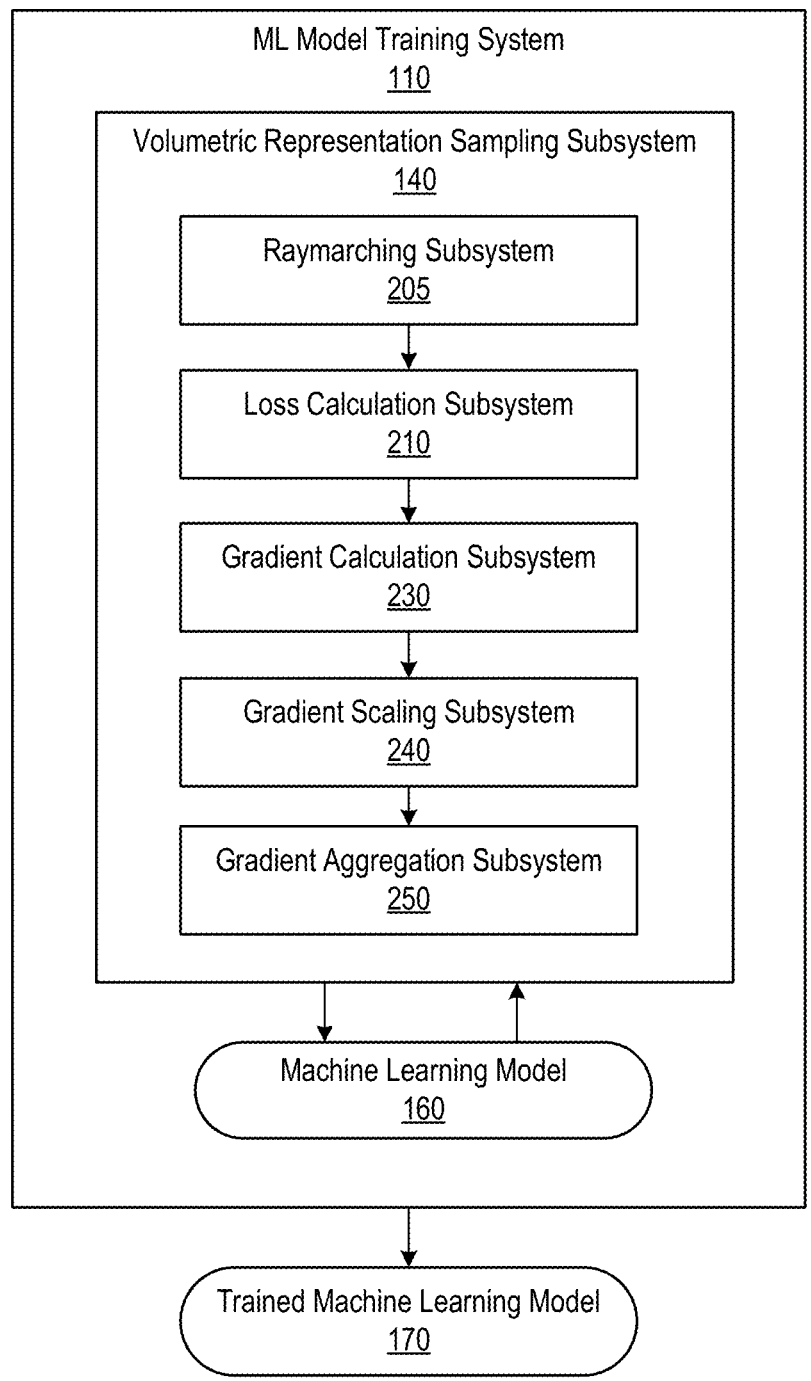
FIG. 2 depicts an example of a system for training an ML model using radiance field gradient scaling for unbiased near-camera training, according to some aspects of the present disclosure.

FIG. 2 depicts an example of a system for training an ML model using radiance field gradient scaling for unbiased near-camera training, according to some aspects of the present disclosure. As described in the description of FIG. 1 above, the ML model training system 110 includes a volumetric representation sampling subsystem 140.

The volumetric representation sampling subsystem 140 includes a raymarching subsystem 205. The raymarching subsystem 205 receives an input image and determines a camera location from the input image. The volumetric representation sampling subsystem 140 then determines a ray from the camera location in a direction of a pixel included in the input image. The ray may be represented, for example, using a data structure that includes the camera location (i.e., the endpoint of the ray) and a vector that indicates the ray's direction, but other data structures may be used.

The raymarching subsystem 205 determines a set of points along the ray to sample. Determination of points may involve selection of a near and far bounds, sometimes referred to as a near plane and a far plane. Points can be selected uniformly within the selected bounds, or algorithms including hierarchical sampling or weighted importance sampling may be used to select points. For instance, some sampling methods may increase the sampling density in regions corresponding to rapidly changing details or colors. The raymarching subsystem 205 may maintain the points to be sampled using a suitable data structure including, for example, an ordered array of representations of 3D points or vectors.

At each selected sample point, the raymarching subsystem 205 performs "ray marching" by iteratively stepping along the ray and providing an input including at least the 3D coordinates of the sample point (i.e., the ray location) and the ray direction to the ML model 160 to obtain a predicted density and color. For instance, if the volumetric representation is a multilayer perceptron (MLP), the MLP is input the coordinates and camera direction (e.g., (x, y, x, θ, ϕ)) associated with the current point along the ray in the 3D environment. The MLP outputs a predicted color and density at that point. The densities and colors sampled at the selected sample points are integrated (e.g., through an accumulation procedure) to obtain a predicted integrated color. For example, the predicted colors may be weighted by the associated predicted densities and the weighted colors may be subsequently summed.

At a loss calculation subsystem 210, the integrated predicted color is then compared with the "ground truth" pixel color from the input image. For example, the predicted color and the pixel color from the input image can be used to define a loss function. In some examples, the loss function may be a least squares error, sometimes referred to as the L2 norm. Other loss functions may be used, including for example, the L1 norm or the least absolute deviation.

The ML model 160 is trained by iteratively performing the sampling and comparison process described and minimizing the loss function so defined. The ML model 160 may be a multilayer perceptron (MLP), sometimes referred to as a fully-connected neural network. An MLP includes multiple layers of interconnected neurons, in which each neuron in a given layer connects to all neurons in the subsequent layer, and information flows in a feedforward manner from input to output without cyclical connections. Some implementations may use other types of neural networks including, for example, convolutional neural networks (CNNs), transformer-based neural networks, recurrent neural networks (RNNs), or graph neural networks (GNNs).

Minimization of the loss function is performed to reduce the difference between the outputs of the volumetric representation modeled by the ML model 160 and the ground truth of the 3D environment as captured in the input image. For example, minimization of the loss function can be achieved through backpropagation, which utilizes computed gradients of the loss function with respect to independent variables such as density and color that can be associated with the ML model 160 parameters using the chain rule. These gradients are then used in optimization algorithms, like stochastic gradient descent, to adjust the parameters in a way that decreases the loss, thereby improving the model predictive accuracy. In stochastic gradient descent, gradients are computed over a randomly selected subset of the sampled points along the ray, thus introducing stochasticity into the backpropagation process.

Gradients are determined by a gradient calculation subsystem 230. In some examples, gradients may be calculated at the points sampled along the ray and then accumulated (e.g., summed) to obtain a gradient that can be applied to the ML model 160 parameters to minimize the loss function. Thus, gradients are initially taken with respect to the input parameters of the loss function (e.g., the 3D coordinates of the point along the ray and the angle and azimuth of the camera direction) and then associated with the ML model 160 parameters using the chain rule.

Techniques for radiance field gradient scaling for unbiased near-camera training can be used to minimize artifacts like background collapse or floaters that may manifest during rendering by the rendering system 120 using a trained ML model 170. A gradient scaling subsystem 240 is used to apply suitable scaling factors to the point-wise gradients determined by the gradient calculation subsystem 230. In some examples, a scaling factor can be determined based on a distance between the camera location and the point along the ray. The application of the scaling factor may, for example, compensate for the over-sampled density close to the cameras while leaving the rest of the gradients further away from the camera unscaled. Some example scaling factors will be discussed in FIG. 3 and the accompanying description.

The volumetric representation sampling subsystem 140 further includes a gradient aggregation system 250. The gradient aggregation system 250 combines the point-wise, scaled gradients output by the gradient scaling subsystem 240. For example, the point-wise, scaled gradients may be summed to obtain a gradient associated with the particular pixel associated with the predicted integrated color discussed above. Using the chain rule and, for example, backpropagation algorithms like gradient descent, the aggregated gradient is used to update one or more parameters of the ML model 160.

During the iterative training of the ML model 160, the output of the ML model 160 on each training step is compared with the ground truth (i.e., the input image) to determine if a desired accuracy has been achieved. In some other examples, training may proceed for a predetermined number of iterations (i.e., training steps) or training time. Once training is completed, ML model training system 110 outputs trained ML model 170.

Trained ML model 170 models the underlying volumetric representation. In some examples, the underlying volumetric representation is modeled by a neural network, like a multilayer perceptron (MLP). In that case, trained ML model 170 can include the weights of the connected layers of the MLP. In some examples, the underlying volumetric representation can be represented by a continuous, differentiable function. For instance, the underlying volumetric representation can be a voxel hash-grid that discretizes 3D space into volumetric pixels (voxels), using a hashing function to store and retrieve radiance and density information of each voxel. Other functional examples include tensor decomposition that breaks down high-dimensional radiance and density data into a set of simpler, lower-dimensional tensors or a direct mapping from the neural network to voxels.

III. Neural Radiance Field Scaling Methodology

Figure 3:
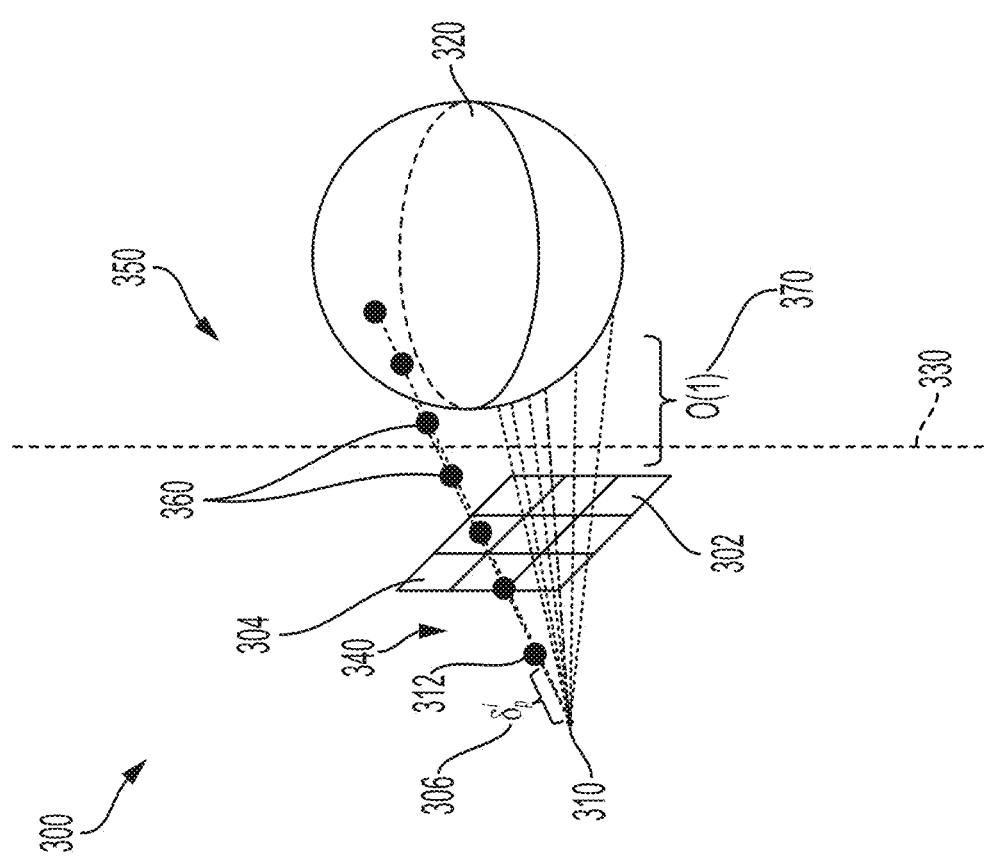
FIG. 3 illustrates an example of radiance field gradient scaling for unbiased near-camera during training of a machine learning model, according to some aspects of the present disclosure.

FIG. 3 illustrates an example 300 of radiance field gradient scaling for unbiased near-camera during training of a machine learning model, according to some aspects of the present disclosure. Example 300 includes an input image 302. The input image 302 is shown as a 2D plane between camera location 310 and distant object 320. The distant object 320 may be a component of a complex 3D environment, but a sphere is shown for simplicity. Radiance field gradient scaling for unbiased near-camera training Some NeRF techniques share common components and assumptions to optimize their volumetric representation. Starting from a set of images captured from calibrated cameras, the goal is to optimize an emissive volumetric density to reproduce the appearance of the input pictures when rendered with piece-wise constant volume rendering. The general optimization framework selects pixels in the input training images, generates a ray starting at the camera location 310 and towards the chosen pixel 304, and performs ray-marching by sampling the data structure at discrete positions 360 (i.e., ray locations) along the ray to obtain colors and density. The colors and density of these samples are integrated to get a color for each ray cast through that pixel. The aggregation of these colors is finally compared with the original pixel value of pixel 304, resulting in a loss for optimization using, for example, stochastic gradient descent.

Given only a set of calibrated input images, the NeRF reconstruction problem is ill-posed and naive solutions may exist. For instance, the ML model 160 may learn a volumetric representation corresponding to a planar surface close to each camera that includes the corresponding 2D input image, leading to a zero reconstruction loss. In practice, the nature of the data structures used in the volumetric representation and loss regularizers partially prevent this from happening, but some artifacts often remain. Two common artifacts include floaters and background collapse in which some geometry is incorrectly reconstructed near the camera. These incorrectly reconstructed geometries may be seen from other viewpoints as floating geometries.

Background collapse is caused by a bias in the amount of gradient near-camera volumes receive. The density of rays cast from the camera location 310 decreases in proportion to the inverse square of the distance from the camera location 310, similar to the propagation of light. Given a camera and a visible volume element and assuming equally spaced samples 360 along the ray, the density of samples falling in the volume element is proportional to the inverse of the square of the distance from that camera. As a result, the volume closest to camera location 310 is disproportionately more sampled than distance volumes. Thus, near-camera regions receive significantly more gradients per volume element, encouraging a fast build-up of density, and creating floating artifacts. Because the underlying volumetric representations modeled by ML model 160 include continuous functions, a higher sampling rate of volume elements may translate to stronger and more frequent gradients for the variables used to represent the density and color of the volume.

In some examples, the bias due to gradients from near-camera volumes has the strongest effect early in the training when the low frequencies (e.g., large-scale, smooth variations across the 3D environment) are not fitted yet. At this early training stage, the gradients are likely to be locally very aligned, pushing uniformly toward the same global direction. For instance, if the colors predicted at early iterations for a small volume are varying around grey but the target is red, all points receive approximately the same gradient to change the color to be redder. In such cases, the gradient for a weight influencing a volume element scales linearly with the sampling density of this volume.

Given a camera location 310 $c_i$, with a view direction $d_i$, points 360 along rays may be sampled uniformly for pixels on the input image 302 plane. Along the points 360 on those rays, assuming points 360 are sampled linearly, the sampling density at a given point 312 $p$ is given by:

$$\rho_i(p) = v_i(p) \times \frac{|p - c_i|}{\vec{d}_i \cdot (p - c_i)} \times \frac{1}{|p - c_i|^2} \qquad (1)$$

Where $v_i(p)$ is a visibility function equal to 1 if p is in the camera field of view and 0 otherwise. The second term accounts for the lower spatial density of rays on the border while the third accounts for the ray spreading with distance. For reasonable camera field of view (FOV), the effect of the second term is negligible in comparison to the distance decay and equation (1) can be approximated as $$\frac{|p - c_i|}{\vec{d}_i \cdot (p - c_i)} \approx 1 \qquad (2)$$

wherein, $\delta_p^i$ is the distance 306 between $c_i$ and p.

Training of the ML model 160 is performed with one or more input images. For n cameras and corresponding input images, the sampling density at a given point 312 $p$ is the sum of the densities from all cameras:

$$\rho(p) = \sum_{i=0}^{n} v_i(p) \times \frac{1}{(\delta_p^i)^2} \qquad (3)$$

The main intuition given by this sum is that for close points shown in region 340, visible and close to a given camera location 310, the sum is dominated by this single camera term, while for far points further away in region 350 and at roughly equal distance from the cameras, the visibility term is what plays a significant role. For close points 340 near cameras, the inverse squared distance has a very significant impact, while these points tend to only be visible to a relatively few cameras. On the other hand, far points 350 around the main subject of the capture tend to be visible by relatively more cameras. For close points 340 near camera location 310, the density decays quadratically and despite lower visibility, the close points 340 near to the camera are disproportionately densely sampled, leading to a disproportionate amount of gradient for these regions.

To compensate for the sampling density bias at close points 340 near camera location 310, the point-wise gradient can be scaled during backpropagation. In an example scaling implementation, the scaling factor is given by:

$$s_{\nabla_p} = \min(1, (\delta_p^i)^2) \quad (4)$$

where the scaling factor is given by the minimum of the two terms in parentheses. In this example, the gradient $\nabla p$ is multiplied by $S_{\nabla_p}$ to obtain scaled point-wise gradient $\nabla p \times S_{\nabla_p}$, where distance term $\delta_p^i$ is the distance 306 between the point 312 and the camera location 310. This scaling compensates for the dominating square density close to camera location 310 while leaving the rest of the gradients unchanged. In this example, the scaling for point 312 depends on the camera location 310 from which the rays are cast.

The example scaling factor given by equation (4) assumes that the typical distance between the camera and captured content in the 3D environment is in the order of 1 unit of distance, illustrated in example 300 with line 330 that demarcates the close points 340 from the far points 350 and scale reference 370. In some examples, the scene scale significantly differs from this assumption (e.g., distance between the camera and captured content in the 3D environment is 0.1 or 10 units of distances). In that case, if the 3D environment is at an order of scene scale factor σ units of distance from camera location 310, the example scaling factor from equation (4) can be replaced by:

$$s_{\nabla_p} = \min\left(1, \frac{(\delta_p^i)^2}{\sigma^2}\right) \quad (5)$$

where the scaling factor is given by the minimum of the two terms in parentheses.

Figure 4A:
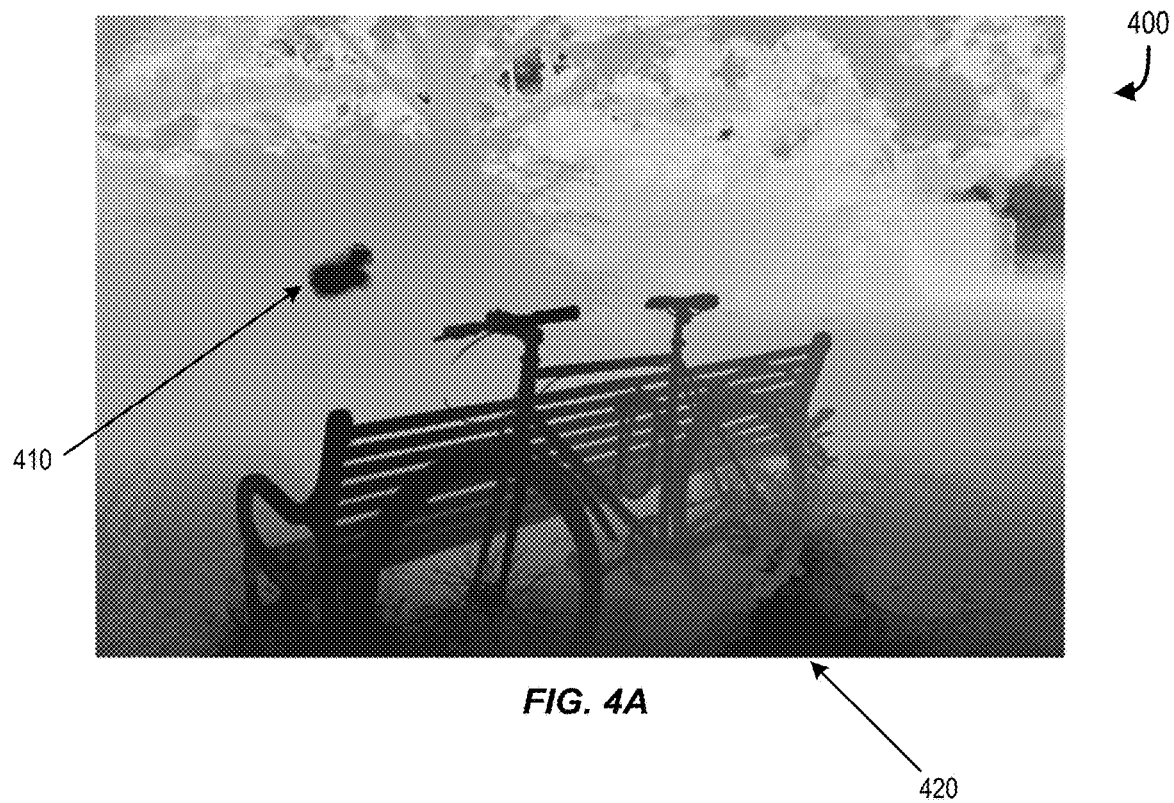
FIGS. 4A-B illustrate examples of rendered 3D images, according to some aspects of the present disclosure.
Figure 4B:
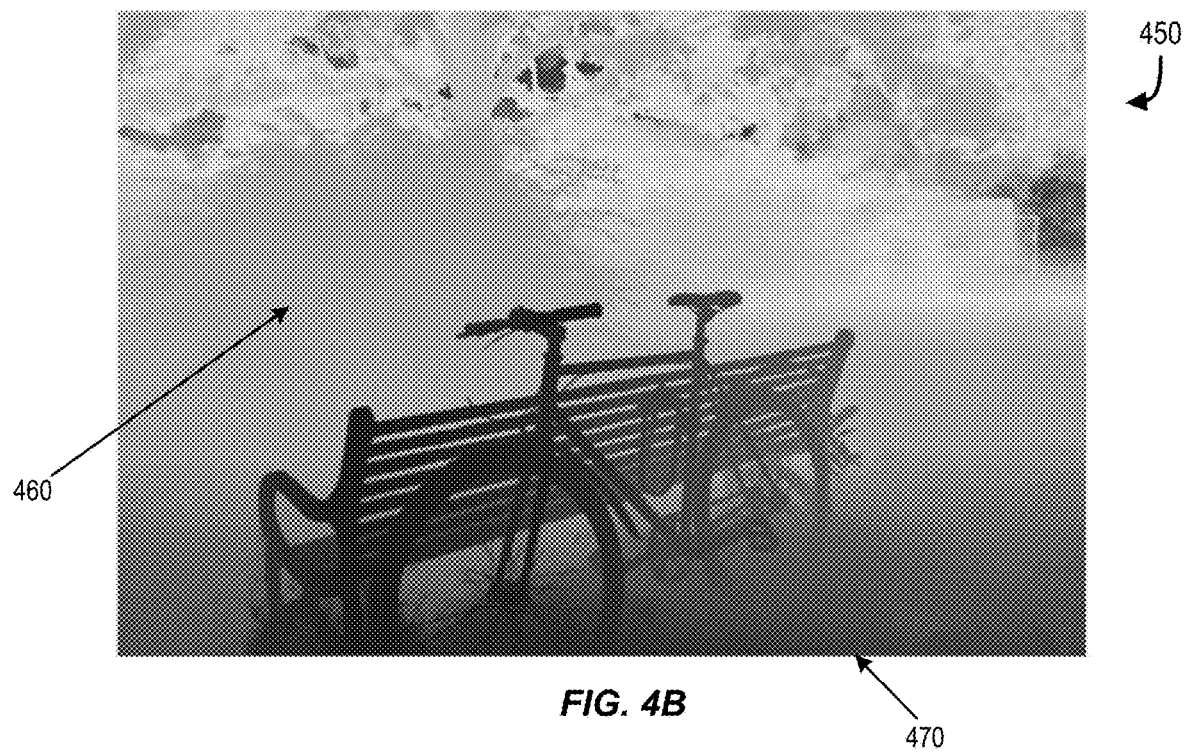

FIGS. 4A-B illustrate examples of rendered 3D images, according to some aspects of the present disclosure. FIG. 4A shows a rendered image 400 generated using traditional approaches for the calculation of gradients for training an ML model 160. Image 400 includes examples of a floater 410 and background collapse 420. Image 400 depicts an example 3D rendering that does not utilize the gradient scaling techniques described above.

In contrast, in FIG. 4B, a rendered image 450, depicts an example 3D rendering whose underlying volumetric representation was modeled by an ML model 160 trained using the techniques of the present disclosure for radiance field gradient scaling for unbiased near-camera training. In image 450, regions 460 and 470, which previously contained a floater and background collapse, respectively, blend seamlessly with the surrounding rendering, which indicates that the floater and background collapse have been eliminated from the 3D rendering rendered using an ML model 160 trained using the gradient scaling techniques of the present disclosure.

FIG. 5 shows example source code 500 for radiance field gradient scaling for unbiased near-camera training, according to some aspects of the present disclosure. Example source code 500 is written in the Python programming language, but any suitable programming language could be used, consistent with the components implementing the 3D reconstruction system, including Java, C++, JavaScript, Ruby, or Rust, among many others. A person of ordinary skill in the art will recognize that the example implementation depicted in example source code 500 is merely an example and that myriad other implementations are possible.

In some examples, the methods described herein can be implemented using specialized frameworks. For instance, example source code 500 uses the PyTorch ML library for tensor computation, graphics processing units (GPU) acceleration, deep learning models, and other functions. Some example implementations may use the JAX Python library for improved performance when performing differentiation and other numerical operations optimized for executing on GPUs or tensor processing units (TPUs).

Example source code 500 depicts a Python class called GradientScaler with two static methods that can be used to implement radiance field gradient scaling for unbiased near-camera training. Example function 510 illustrates one possible implementation of ray-marching, during which density and color are predicted for the selected sample points as described above in FIG. 2 and the accompanying description. In example function 510, during this "forward pass," no scaling is performed. Example variables colors, sigmas, ray_dist refer to data structures that represent the point-wise color, density, and distance to camera location 310.

Example function 520 operates during backpropagation or during the "backward pass." An implementation of example scaling factor of equation (4) is calculated at line 530, where the distance to camera location 310 is squared and the output is fixed inside the boundaries 0 and 1 using the clamp function. The scaling factor calculated at line 530 is applied to the gradients calculated with respect to the color and density at 540 and 550, respectively. The unsqueeze function at 550 can be used to adjust the dimensionality of the output gradients.

Figure 6:
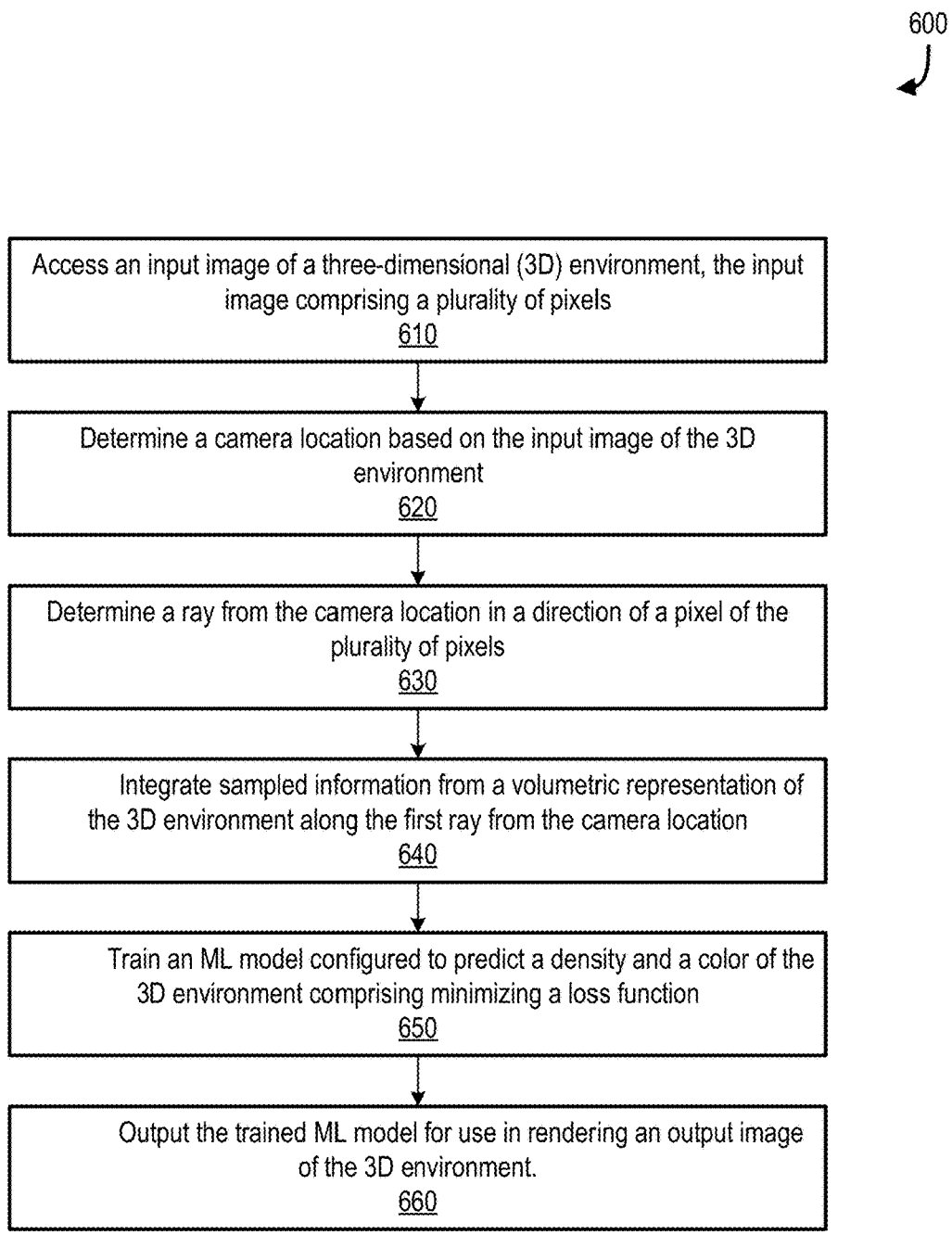
FIG. 6 depicts an example process for training an ML model for providing radiance field gradient scaling for unbiased near-camera training, according to some aspects of the present disclosure.

IV. Example Process for a Training Machine Learning Model Using Techniques for Radiance Field Gradient Scaling for Unbiased Near-Camera Training FIG. 6 depicts an example process 600 for training an ML model for providing radiance field gradient scaling for unbiased near-camera training, according to some aspects of the present disclosure. For illustrative purposes, the process 600 is described with reference to the components illustrated in FIGS. 1-2, though other implementations are possible. For example, the components of the ML model training system 110 are shown in FIG. 2 as part of a single component but distributed or hybrid architectures are also possible. In other examples, some components may be combined or further subdivided according to function or structure. Process 600 may be implemented by the ML model training system 110.

At block 610, a processing device, such as the ML training system 110, accesses an input image of a three-dimensional (3D) environment, the input image comprising a set of pixels. For example, the ML training system 110 can access an input image at image storage 130. The input image may be generated using a calibrated camera such as ones that have been accurately adjusted and configured to ensure precise capture of positional and orientation details. Both extrinsic and intrinsic details about the calibrated camera are used as input to the ML training system 110 for use by the raymarching subsystem 205 of the volumetric representation sampling subsystem 140. Extrinsic parameters capture the camera's position and orientation in the world, while intrinsic parameters, such as the focal length, pertain to the camera's internal characteristics. For example, the input image may include associated information like embedded metadata relating to the camera's position, orientation, and intrinsic parameters (e.g., focal length) at the time the image was captured.

Image storage 130 stores and sends input images to ML model training system 110 using any suitable image file format. Input images can be of high quality and consistent (e.g., constant resolution) among each other. Noise, motion blur, or differential lighting conditions can lead to the generation of artifacts or inaccurate 3D representations in the rendered output. Input images can include a diverse coverage of viewpoints for the 3D environment as inadequate coverage can result in incomplete or distorted 3D reconstructions when rendering from novel viewpoints that are not present in the training data.

At block 620, the processing device determines a camera location based on the input image of the 3D environment. For example, raymarching subsystem 205 of the volumetric representation sampling subsystem 140 can determine, given metadata associated with the input image (e.g., 3D location, direction, lighting conditions, etc.) and the extrinsic and intrinsic information relating to the calibrated camera, the camera location 310 in the coordinate system of the 3D environment. For example, the information about camera location 310 and direction (e.g., metadata) received from the input image can be mapped from a local coordinate system to the coordinate system of the 3D environment.

At block 630, the processing device determines a ray from the camera location 310 in a direction of a pixel of the set of pixels. For example, given camera location 310, raymarching subsystem 205 of the volumetric representation sampling subsystem 140 can determine a direction for the ray by first situating the input image within the 3D environment, based on the position and orientation of the camera at the time the image was captured, to align the 2D pixel grid of the image with the 3D coordinates of the 3D environment. The ray can be represented by its origin (i.e., camera location 310) and direction. The direction is a 3D vector pointing from the camera's location through the pixel of the set of pixels. In some examples, the vector is normalized to have a length of one. Functions included in block 630 can be used to implement a step for determining the set of densities and colors of the 3D environment from a training perspective of a first camera location at a plurality of respective points sampled along a first ray projected from the first camera location.

At block 640, the processing device integrates sampled information from a volumetric representation of the 3D environment along the first ray from the camera location. For example, raymarching subsystem 205 of the volumetric representation sampling subsystem 140 can determine a set of points along the ray to sample. Points can be selected uniformly, or using algorithms including hierarchical sampling or weighted importance sampling may be used to select points. In some examples, such approaches may be used to dynamically adjust the point selection to obtain higher sampling density in regions near object boundaries or areas of significant color change.

At each sample point along the first ray, the volumetric representation modeled by the ML model 160 is sampled by providing an input including at least the 3D coordinates of the sample point 312 and the ray direction to the ML model 160 to obtain a density and a color. The densities and colors sampled at the selected sample points 360 are integrated (e.g., through an accumulation procedure) to obtain a predicted color. For example, a weighted sum or other arithmetic operation beginning from the furthest point from camera location 310 may be used to account for the accumulated density as the operation progresses. Functions included in block 640 can be used to implement a step for aggregating the plurality of densities and colors of the 3D environment to generate an integrated pixel color.

At block 650, the processing device trains an ML model 160 configured to predict a density and a color of the 3D environment comprising minimizing a loss function. The ML model 160 is trained by iteratively performing the sampling and comparison process described and minimizing the loss function discussed herein. For example, the integrated predicted color can be compared with the "ground truth" pixel color from the input image. The predicted color and the pixel color from the input image 302 can be used to define a loss function. For example, a pixel-wise difference metric, such as the least squared error (i.e., L2 norm), can be used to capture the average magnitude of the error across pixels and color channels.

Training ML model 160 further includes minimizing the loss function using a scaling factor that is determined based on a distance 306 between the camera location 310 and a point 312 along the ray, the loss function defined based on a difference between the integrated color and the pixel color of the pixel. Minimization of the loss function can be achieved during backpropagation following the ray-marching procedure described above. During backpropagation, gradients of the loss function are determined which can be represented in terms of the parameters of the ML model 160 using the chain rule. In some examples, gradients may be calculated at the points 360 sampled along the ray and then accumulated (e.g., summed) to obtain an aggregated scaled gradient that can be applied to the ML model 160 parameters to minimize the loss function.

Techniques for radiance field gradient scaling for unbiased near-camera training can be used to minimize artifacts like background collapse or floaters that may manifest during rendering by rendering system 120 using a trained ML model 170. In some examples, a scaling factor can be determined based on a distance 306 between the camera location and the point along the ray. The scaling factor can be, for example, applied to the point-wise gradients prior to accumulation. The application of the scaling factor compensates for the over-sampled density close to the cameras while leaving the rest of the gradients further away from the camera unscaled. Example scaling factors are discussed in the description accompanying FIG. 3. In some examples, the scene scale may differ from an assumption of a distance scale of order 1. In that case, the scaling factor can include a scene scale term to accurately apply the scaling factor to scenes with the given scene scale. Functions included in block 650 can be used to implement a step for minimizing the loss function of the ML model 160 using a scaling factor that is determined based on a distance between the first camera location and a point along the first ray projected from the first camera location towards the 3D environment.

At block 660, the processing device outputs the trained ML model 170 for use in rendering an output image of the 3D environment. For example, after the ML model 160 is trained to a desired accuracy or according to a predetermined number of training iterations, the ML model training system 110 can output a trained ML model 170 for use in rendering system 120. Trained ML model 170 can receive 3D coordinates corresponding to a novel (i.e., not included in the training data) camera location and the angle and azimuth of the camera direction (e.g., a 5D coordinate vector) and output a predicted pixel color for each camera direction corresponding to a pixel in an output image. In some examples, a series of rendered images can be generated in this way and assembled to create an animation or video depicting motion through the 3D environment.

Figure 7:
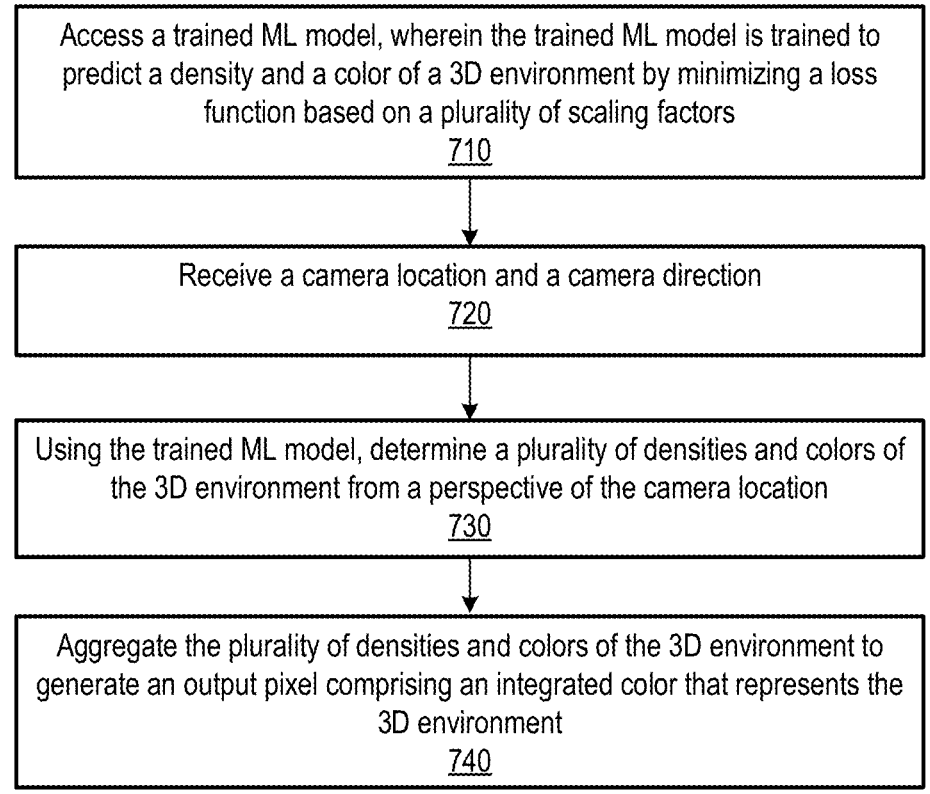
FIG. 7 depicts an example process for using a trained ML model trained for 3D rendering and reconstruction, according to some aspects of the present disclosure.

V. Example Process for Using a Machine Learning Model Trained Using Techniques for Radiance Field Gradient Scaling for Unbiased Near-Camera Training FIG. 7 depicts an example process 700 for using a trained ML model trained for 3D rendering and reconstruction, according to some aspects of the present disclosure. For illustrative purposes, the process 700 is described with reference to the components illustrated in FIG. 1, though other implementations are possible. For example, the components of the rendering system 120 are shown in FIG. 1 apart from the components of ML training system 110. In some examples, as when the trained ML model 170 is the same component as the ML model 160, after training, the rendering system 120 and the ML training system 110 may be included in a single server or computing environment, but other distributed architectures are possible. In other examples, some components may be combined or further subdivided according to function or structure. Process 700 may be implemented by the rendering system 120.

At block 710, a processing device accesses a trained ML model 170, wherein the trained ML model is trained to predict a density and a color of a 3D environment by minimizing a loss function based on a set of scaling factors. For example, the trained ML model 170 may be trained using the techniques described in process 600 and the accompanying description. Trained ML model 170 can be trained to model an underlying volumetric distribution. For instance, the trained ML model 170 can include the weights of the connected layers of an MLP. In some examples, the underlying volumetric representation can be represented by a function, like the MLP itself, a voxel hash-grid, a tensor decomposition, or a direct mapping to voxels. The trained ML model 170 may thus be accessed in a form independent of the ML model training system 110. In some examples, the trained ML model 170 may be the ML model 160 generated by the ML model training system 110, after training is completed.

Trained ML model 170 is trained using techniques for radiance field gradient scaling for unbiased near-camera training can be used to minimize artifacts like background collapse or floaters that may manifest during rendering by the rendering system. For example, a scaling factor can be determined based on a distance 306 between the camera location and the point along the ray. The scaling factor can be, for example, applied to the point-wise gradients prior to accumulation. The application of the scaling factor compensates for the over-sampled density close to the cameras while leaving the rest of the gradients further away from the camera unscaled. Example scaling factors are discussed in the description accompanying FIG. 3.

At block 720, the processing device receives a camera location and a camera direction. For example, trained ML model 170 can receive 3D coordinates corresponding to a novel (i.e., not included in the training data) camera location and the angle and azimuth of the camera direction. The 3D coordinates of the received camera location 310 may differ from the 3D coordinate system of the 3D environment. In that case, a mapping from the camera local coordinate system to the coordinate system of the 3D environment may be performed.

At block 730, the processing device, using the trained ML model, determines a set of densities and colors of the 3D environment from a perspective of the camera location 310. For example, the processing device may determine a ray and sample points 360 along the ray in the direction of the selected camera direction. At each sampled point the underlying volumetric representation of the trained ML model 170 predicts a color and density. For instance, an MLP can receive the 5D coordinates of the point 312 and the camera direction 310 and output a color and density associated with the point 312.

At block 740, the processing device aggregates the set of densities and colors of the 3D environment to generate an output pixel comprising an integrated color that represents the 3D environment. As described in process 600 with respect to training the ML model 160, the point-wise densities and colors can be accumulated to obtain a predicted pixel color for each camera direction corresponding to an output pixel 304 in an output image.

The process of steps 710 to 730 can be repeated for the set of pixels in the 2D plane of the desired target output image. Multiple rendered images from novel camera locations of a given 3D environment can be generated using the innovations of the present disclosure in for applications including enhancing virtual reality/augmented reality (VR/AR) experiences, generating photorealistic 3D animations, development of video game graphics, architectural visualization, creating 3D models for e-commerce, and improving medical imaging and simulation, among others.

VI. Example of a Computing Environment

Figure 8:
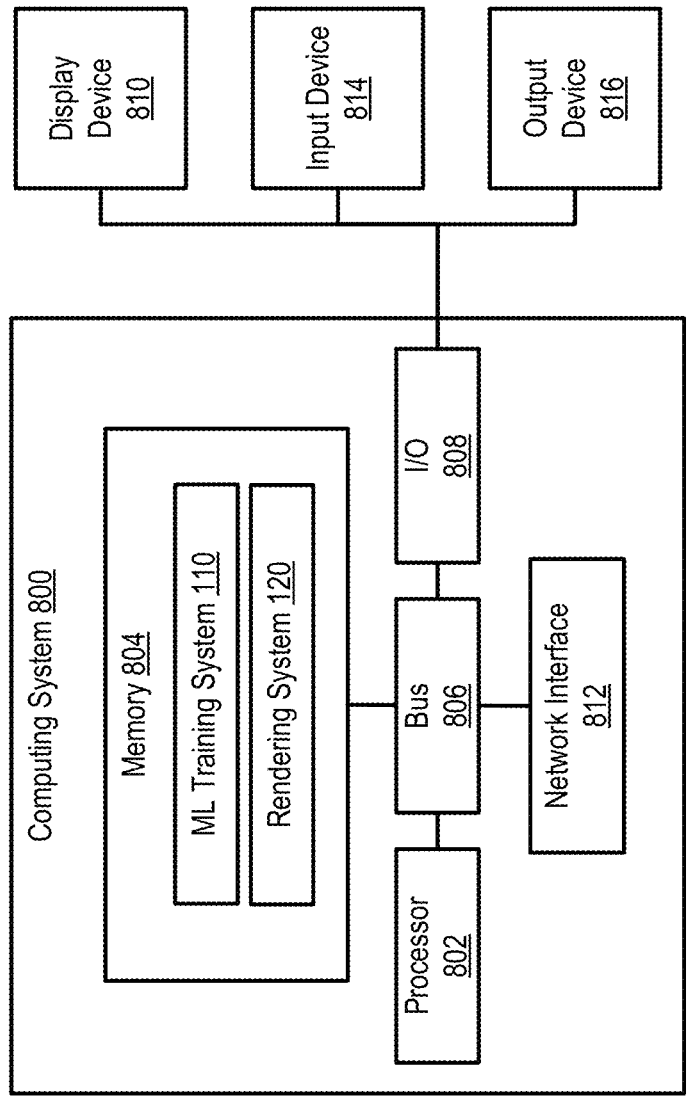
FIG. 8 depicts a computing system that can implement radiance field gradient scaling for unbiased near-camera training, according to some aspects of the present disclosure.

Any suitable computing system or group of computing systems can be used for performing the operations described herein. For example, FIG. 8 depicts a computing system 800 that can implement any of the computing systems or environments discussed above. In some embodiments, the computing system 800 includes a processing device 802 that executes program code implementing the ML training system 110 and the rendering system 120, a memory component that stores various data computed or used by the ML training system 110 and the rendering system 120, an input device 814 (e.g., a mouse, a stylus, a touchpad, a touchscreen), and an output device 816 that presents output to a user (e.g., a display device that displays graphical content generated by the ML training system 110 and the rendering system 120). For illustrative purposes, FIG. 8 depicts a single computing system on which the ML training system 110 and the rendering system 120 are executed, and the input device 814 and output device 816 are present. But these applications, datasets, and devices can be stored or included across different computing systems having devices similar to the devices depicted in FIG. 8.

The example of FIG. 8 includes a processing device 802 communicatively coupled to one or more memory devices 804. The processing device 802 executes computer-executable program code stored in a memory device 804, accesses information stored in the memory device 804, or both. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory device 804 includes any suitable non-transitory machine-readable storage medium for tangibly storing data, program code, a computer program product, or the like. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as a display device 810, or other input or output devices. For example, the computing system 800 is shown with one or more input/output ("I/O") interfaces 808. An I/O interface 808 can receive input from input devices or provide output to output devices. One or more buses 806 are also included in the computing system 800. Each bus 806 communicatively couples one or more components of the computing system 800 to each other or to an external component.

The computing system 800 executes program code that configures the processing device 802 to perform one or more of the operations described herein. The program code includes, for example, code implementing the ML training system 110 and the rendering system 120 or other suitable applications that perform one or more operations described herein. The program code may be resident in the memory device 804 or any suitable computer-readable medium and may be executed by the processing device 802 or any other suitable processor. In some embodiments, all modules or subsystems in the ML training system 110 and/or the rendering system 120 are stored in the memory device 804, as depicted in FIG. 8. In additional or alternative embodiments, one or more of these modules or subsystems from the ML training system 110 and/or the rendering system 120 are stored in different memory devices of different computing systems.

In some embodiments, the computing system 800 also includes a network interface device 812. The network interface device 812 includes any device or group of devices suitable for establishing a wired or wireless data connection to one or more data networks. Non-limiting examples of the network interface device 812 include an Ethernet network adapter, a modem, and/or the like. The computing system 800 is able to communicate with one or more other computing devices (e.g., a computing device that receives inputs for ML training system 110 and the rendering system 120 or displays outputs of ML training system 110 and the rendering system 120) via a data network using the network interface device 812.

An input device 814 can include any device or group of devices suitable for receiving visual, auditory, or other suitable input that controls or affects the operations of the processing device 802. Non-limiting examples of the input device 814 include a touchscreen, stylus, a mouse, a keyboard, a microphone, a separate mobile computing device, etc. An output device 816 can include any device or group of devices suitable for providing visual, auditory, or other suitable sensory output. Non-limiting examples of the output device 816 include a touchscreen, a monitor, a separate mobile computing device, etc.

Although FIG. 8 depicts the input device 814 and the output device 816 as being local to the computing device that executes the ML training system 110 and/or the rendering system 120, other implementations are possible. For instance, in some embodiments, one or more of the input devices 814 and output devices 816 include a remote client-computing device that communicates with the computing system 800 via the network interface device 812 using one or more data networks described herein.

VII. General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising one or more computing devices performing operations comprising:
- accessing an input image of a three-dimensional (3D) environment, the input image comprising a plurality of pixels, wherein each pixel of the plurality of pixels comprises a pixel color;
- determining a camera location based on the input image of the 3D environment;
- determining a ray from the camera location in a direction of a pixel of the plurality of pixels;
- integrating sampled information from a volumetric representation of the 3D environment along the ray from the camera location to obtain an integrated color corresponding to the pixel;
- training a machine learning (ML) model configured to predict a density and a color of the 3D environment, the training comprising minimizing a loss function using a scaling factor that is determined based on a distance between the camera location and a point along the ray, the loss function defined based on a difference between the integrated color and the pixel color of the pixel; and
- outputting the trained ML model for use in rendering an output image of the 3D environment.

2. The method of claim 1, wherein the scaling factor is determined further based on a scene scale factor, wherein the scene scale factor is based on the distance between the camera location and a feature of the 3D environment.

3. The method of claim 1, wherein the sampled information from the volumetric representation of the 3D environment along the ray from the camera location is generated by:
- determining a plurality of ray locations along the ray; and
- for each ray location of the plurality of ray locations along the ray:
  - determining a sampled density and a sampled color from the volumetric representation associated with the ray location.

4. The method of claim 3, wherein minimizing the loss function using the scaling factor that is determined based on the distance between the camera location and the point along the ray comprises:
- for each ray location of the plurality of ray locations along the ray:
  - determining a point-wise gradient of the ML model, based on the difference between the integrated color and the pixel color of the pixel; and
  - scaling the point-wise gradient using the scaling factor based on the distance between the camera location and the point along the ray to obtain a scaled point-wise gradient;
- aggregating the scaled point-wise gradients determined for each ray location of the plurality of ray locations to obtain an aggregated scaled gradient; and
- applying the aggregated scaled gradient to one or more parameters of the ML model.

5. The method of claim 4, wherein the scaling factor is the minimum of 1 and a distance term based on the distance between the camera location and the point along the ray.

6. The method of claim 1, wherein the ML model is a multilayer perceptron (MLP).

7. The method of claim 1, wherein the volumetric representation comprises one of an MLP, a voxel hash-grid, a tensor decomposition, or voxels.

8. A system, comprising:
- a memory component; and
- one or more processing devices coupled to the memory component configured to perform operations comprising:
  - accessing a trained machine learning (ML) model, wherein the trained ML model is trained to predict a density and a color of a 3D environment by minimizing a loss function based on a plurality of scaling factors, wherein each of the plurality of scaling factors are determined based on a distance between a first camera location and a point along a first ray projected from the first camera location towards a pixel in an input image comprising a pixel color;
  - receiving a second camera location and a camera direction;
  - using the trained ML model, determining a plurality of densities and colors of the 3D environment from a perspective of the second camera location at a plurality of respective points sampled along a second ray projected from the second camera location in the direction of the camera direction; and
  - aggregating the plurality of densities and colors of the 3D environment to generate an output pixel comprising an integrated color that represents the 3D environment.

9. The system of claim 8, wherein each scaling factor is determined further based on a scene scale factor, wherein the scene scale factor is based on a distance scale that characterizes the 3D environment.

10. The system of claim 8, wherein predicting the density and the color of a 3D environment comprises:
- determining a plurality of ray locations along the first ray; and
- for each ray location of the plurality of ray locations along the first ray:
  - determining a sampled density and a sampled color from a volumetric representation associated with the ray location.

11. The system of claim 10, wherein minimizing the loss function based on the plurality of scaling factors, wherein each of the plurality of scaling factors are determined based on the distance between the first camera location and the point along the first ray projected from the first camera location towards the pixel in the input image comprising the pixel color comprises:
- for each ray location of the plurality of ray locations along the first ray:
  - determining a point-wise gradient of the ML model, based on a difference between the integrated color and the pixel color of the pixel; and
  - scaling the point-wise gradient using the scaling factor based on the distance between the first camera location and the point along the first ray to obtain a scaled point-wise gradient;
- aggregating the scaled point-wise gradients determined for each ray location of the plurality of ray locations to obtain an aggregated scaled gradient; and
- applying the aggregated scaled gradient to one or more parameters of the ML model.

12. The system of claim 8, wherein the ML model is a fully-connected neural network.

13. The system of claim 8, wherein determining the plurality of densities and colors of the 3D environment from the perspective of the second camera location at the plurality of respective points sampled along the second ray projected from the second camera location is based on a volumetric representation, wherein the volumetric representation comprises one of a multilayer perceptron (MLP), a voxel hashgrid, a tensor decomposition, or voxels.

14. A computer program product tangibly embodied in a non-transitory machine-readable storage medium including instructions configured to cause one or more processing devices to perform actions including:

accessing a machine learning (ML) model trained via a training process, wherein the ML model is configured to predict a color of a 3D environment, wherein the training process comprises:
- a step for determining a plurality of densities and colors of the 3D environment from a training perspective of a first camera location at a plurality of respective points sampled along a first ray projected from the first camera location;
- a step for aggregating the plurality of densities and colors of the 3D environment to generate an integrated pixel color; and
- a step for minimizing a loss function of the ML model using a scaling factor that is determined based on a distance between the first camera location and a point along the first ray projected from the first camera location towards the 3D environment; and receiving a second camera location and a camera direction;

using the trained ML model, determining a plurality of densities and colors of the 3D environment from a perspective of the second camera location at a plurality of respective points sampled along a second ray projected from the second camera location in the direction of the camera direction; and aggregating the plurality of densities and colors of the 3D environment to generate an output pixel comprising an integrated color that represents the 3D environment.

15. The computer program product of claim 14, wherein the scaling factor is determined further based on a scene scale factor, wherein the scene scale factor is based on the distance between the first camera location and a feature of the 3D environment.

16. The computer program product of claim 14, wherein the step for determining the plurality of densities and colors of the 3D environment from the training perspective of the first camera location at the plurality of respective points sampled along the first ray projected from the first camera location comprises:

determining a plurality of ray locations along the first ray; and for each ray location of the plurality of ray locations along the first ray:
- determining a sampled density and a sampled color based on a volumetric representation associated with the ray location.

17. The computer program product of claim 16, wherein minimizing the loss function using the scaling factor that is determined based on the distance between the first camera location and the point along the first ray comprises:

for each ray location of the plurality of ray locations along the first ray:
- determining a point-wise gradient of the ML model, based on a difference between the integrated color and the pixel color of the pixel; and
- scaling the point-wise gradient using the scaling factor based on the distance between the first camera location and the point along the first ray to obtain a scaled point-wise gradient;

aggregating the scaled point-wise gradients determined for each ray location of the plurality of ray locations to obtain an aggregated scaled gradient; and applying the aggregated scaled gradient to one or more parameters of the ML model.

18. The computer program product of claim 17, wherein the scaling factor is the minimum of 1 and the square of the distance between the first camera location and the point along the first ray.

19. The computer program product of claim 14, wherein the ML model is a multilayer perceptron (MLP).

20. The computer program product of claim 14, wherein determining the plurality of densities and colors of the 3D environment from the perspective of the second camera location at the plurality of respective points sampled along the second ray projected from the second camera location is based on a volumetric representation, wherein the volumetric representation comprises one of an MLP, a voxel hashgrid, a tensor decomposition, or voxels.

* * * * *